United States Patent

Thomenius

[15] 3,678,398

[45] July 18, 1972

[54] PRESETTABLE FREQUENCY DIVIDER

[72] Inventor: Kai E. Thomenius, Monmouth, N.J.

[73] Assignee: The United States of America as represented by the Secretary of the Army

[22] Filed: March 23, 1972

[21] Appl. No.: 127,297

[52] U.S. Cl. ....................328/48

[51] Int. Cl. ....................H03k 21/32

[58] Field of Search ....................328/48

[56] References Cited

UNITED STATES PATENTS

| | | | |
|---|---|---|---|
| 3,044,065 | 7/1962 | Barney et al. | 328/48 X |
| 3,096,483 | 7/1963 | Ransom | 328/48 |

*Primary Examiner*—John S. Heyman
*Attorney*—Harry M. Saragovitz, Edward J. Kelly, Herbert Berl and Jeremiah G. Murray

[57] ABSTRACT

A frequency divider including two down-counters having common input and output terminals, an input signal steering device, and a presettable logic circuit. The latter includes a series of switches which are preset to establish a particular divisor by establishing an initial count in the down-counters. The steering device includes a pair of gates which steers the input signal to one of the two down-counters which in turn counts the cycles of the input signals. After counting down to zero, the down-counter generates an input signal which is used by: (1) the steering device, to transfer the input signal to the other down-counter; (2) the presettable logic circuit, to reestablish the count in the down-counters, and the output terminal, to generate the frequency divided output.

2 Claims, 1 Drawing Figure

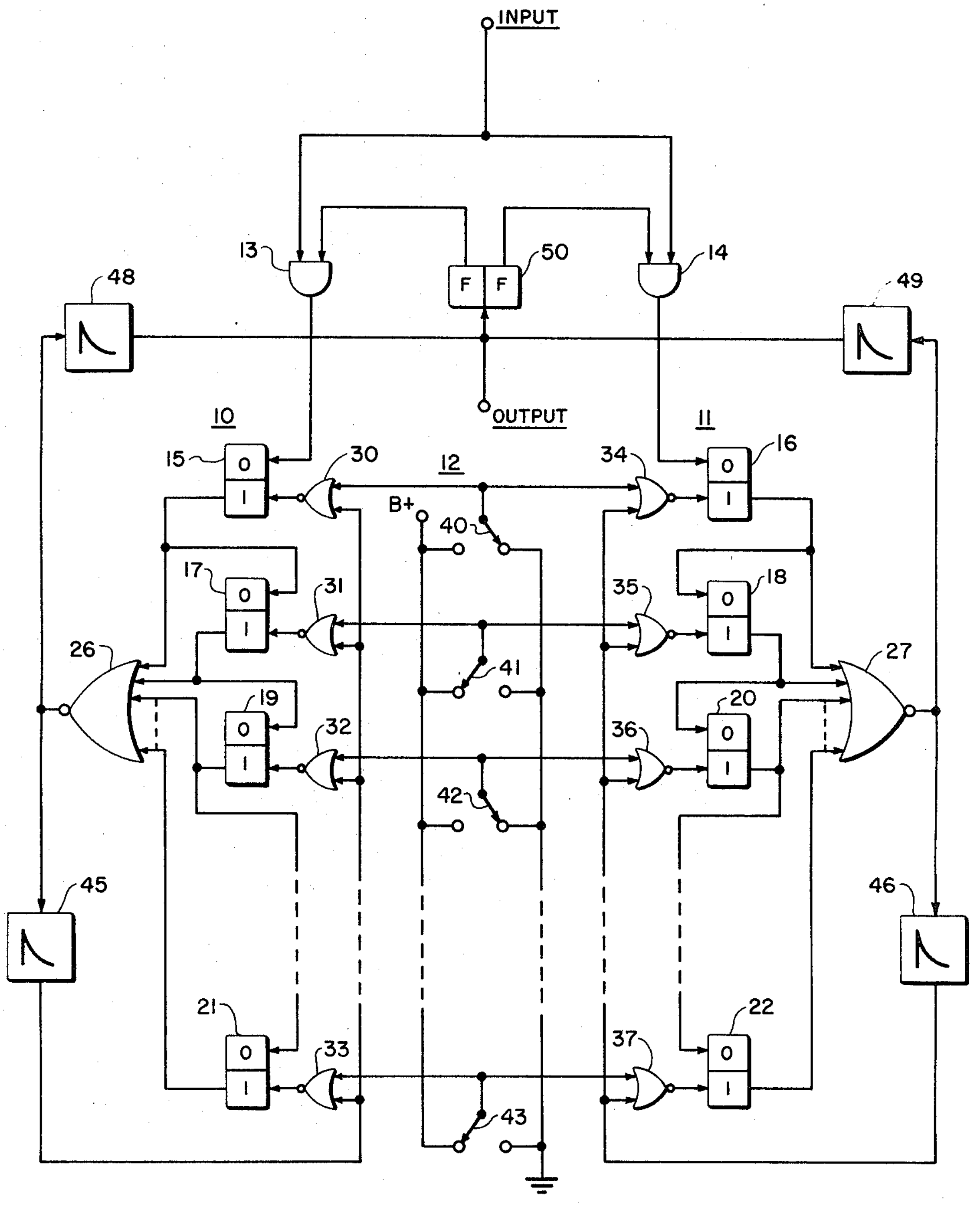
INVENTOR,
KAI E. THOMENIUS
BY: AGENT
ATTORNEYS

PRESETTABLE FREQUENCY DIVIDER

The present invention relates to high speed, presettable, frequency dividers.

In the field of frequency conversion, it has been the general practice to include as part of frequency dividers a presettable mechanism by which the device may be easily programmed to any one of a plurality of divisors. Such devices have had only limited use because of the characteristically low speed limitations. For example, in an up-counter, which uses a plurality of flip-flops, the relatively low speed arises because the last cycle of the count must propagate through most or all of the flip-flops. In the case of a down-counter, the time required for programming the flip-flops is the speed limiting factor.

The general purpose of this invention is to provide a high speed, presettable, frequency divider. To attain this, the present invention contemplates a unique combination of two identical down-counters connected back-to-back and two recognition circuits, whereby the maximum frequency that can be counted is limited only by the time required to switch the input from one of the down-counters to the other.

The exact nature of this invention as well as other objects and advantages thereof will be readily apparent from consideration of the following specification relating to the annexed drawing which shows a schematic diagram of a preferred embodiment.

Referring now to the drawing, there is shown a pair of down-counters 10 and 11 connected back-to-back by a presettable binary logic device 12.

An input terminal is connected via AND gates 13 and 14 to the set side of the first stage flip-flops 15 and 16 of each of the down-counters 10 and 11 respectively. As is usual in a down-counter, the outputs of the consecutive stages in each of the down-counters 10 and 11 are connected to the inputs of the immediately following stage. For example, the outputs of flip-flops 15, 17 and 19 are connected to the set inputs of flip-flops 17, 19 and 21 respectively. Likewise, the outputs of flip-flops 16, 18 and 20 are connected to the set inputs of flip-flops 18, 20 and 22 respectively. Of course, only four stages are shown in each of the down-counters 10 and 11 for simplicity; however, as indicated by the broken lines between the third stages (flip-flops 19 and 20) and the last stages (flip-flops 20 and 22), any number of stages may be employed.

The outputs of flip-flops 15, 17, 19 and 21 are connected to the input of NOR gate 26; and the outputs of flip-flops 16, 18, 20 and 22 are connected to the inputs of NOR gate 27.

The binary logic 12 includes a first set of two input NOR gates 30, 31, 32 and 33 having the outputs thereof connected to the reset inputs of flip-flops 15, 17, 19 and 21 respectively. Also included is a second set of two-input NOR gates 34, 35, 36 and 37 having the outputs thereof connected to the reset inputs of flip-flops 16, 18, 20 and 22 respectively. One of the inputs of each of the NOR gates 30–37 is selectively connected to either a $B^+$ voltage or ground via a set of relays 40, 41, 42 and 43, which constitutes a preset mechanism for programming the divisors. The second inputs to NOR gates 30–33 are connected to the output of NOR gate 26 via a pulse shaper 45. The output of NOR gate 27 is connected via pulse shaper 46 to the second inputs of NOR gates 34–37.

The outputs of NOR gates 26 and 27 are also connected in common to the input of a complementary flip-flop 50 via pulse shapers 48 and 49 respectively. The dual outputs of flip-flops 50 are connected to one of the inputs of AND gates 13 and 14. Finally, the output terminal is connected to the input of flip-flop 50.

Operation of the counter may be described as follows: A particular divisor is preset into the counter by selectively adjusting the relays 40–43; for example, the divisor five is preset by adjusting the relays to the positions shown in the FIGURE i.e., 0101. The initial states of the flip-flops 15–22 is determined by the positions of the relays 40–43. An input signal is alternately steered by AND gates 13 and 14, depending on the state of flip-flop 50, to one of the down-counters 10 or 11 where the number of input cycles are counted. While the input signal is being counted by one of the down-counters 10 or 11, the other down-counter is being preset to the initial state. When one of the down-counters 10 or 11 counts down to the zero state, i.e., 0000, a pulse is generated at the output of the associated NOR gates 26 or 27. This output pulse changes the state of flip-flop 50 via pulse shapers 48 or 49 which transfers the input signal from one of the down-counters to the other. The frequency divided output signal will appear at the output terminal. The output pulse from the NOR gates 26 and 27 is also used to reset the counters 10 and 11 to the initial state via the pulse shapers 45 and 46.

More specifically, an input signal having a frequency of $f_1$ and applied to the input terminal of the device shown in the FIGURE would produce an output signal at the output terminal of $f_1/5$. Assume that initially the flip-flop 50 is in a state such that a logical 1 is being applied to AND gate 13 and the complement or a logical 0 is being applied to AND gate 14. With AND gate 13 turned on, the output thereof will have a frequency equal to that of the input signal, $f_1$. It can also be assumed that the down-counters 10 and 11 are preset such that the outputs thereof are 0101 (a decimal 5).

It is pointed out that flip-flops 21 and 22 contain the most-significant-bits and flip-flops 15 and 16 contain the least-significant-bits. Therefore the output of flip-flops 21 and 22 are initially preset at a logical 0 while the outputs of flip-flops 15 and 16 are preset to a logical 1.

With each of the first five input cycles, which are assumed to be initially passed by AND gate 13, the flip-flop 15 will change state, i.e., the flip-flop 15 output will change to the consecutive states 01010 for the first five input cycles. The output of flip-flop 15 is connected to the input of flip-flop 17, such that the latter will change state when the former changes from a logical 0 to a logical 1. Therefore, for the first five input cycles of $f_1$ the output of flip-flop 17 will be 01100. Likewise, the outputs of flip-flops 19 and 21 will change state when the outputs of flip-flops 17 and 19 respectively change from a logical 0 to a logical 1. Therefore, for the first five input cycles, the outputs of flip-flops 19 and 21 will be 11100 and 00000 respectively. It can therefore be seen that at the fifth input cycle, the down-counter 10 will have counted down, from the preset five to a zero, since the outputs from all flip-flops 15, 17, 19 and 21 will all be a logical 0. At this point, the output of the NOR gate 26 will change from a logical 0 to a logical 1. This change, in the output of the NOR gate 26, will cause pulse shaper 48 to apply a signal, of any desired shape as determined by the characteristics of the shaper 48, to the output terminal. Therefore, for the first five input cycles at $f_1$ there is one cycle of the output signal at $f_1/5$.

The output signal is also used at this point to change the state of flip-flop 50, thereby turning AND gate 13 off and turning AND gate 14 on. At this point, the input signal is now transferred to down-counter 11 where the next five input cycles are counted after which another cycle of the signal is now generated by shaper 49 in response to the signal from NOR gate 27.

While the down-counter 11 is counting, the flip-flops 15, 17, 19 and 21 are being reset to the 0101 state by an output pulse from shaper 45 in response to a logical 1 output signal from NOR gate 26.

Obviously many modifications and variations of the present invention are possible in the light of the above teachings. It is therefore to be understood, that within the scope of the appended claims, the invention may be practiced otherwise than as specifically described.

What is claimed is:

1. A frequency divider comprising:

input signal steering means having an input terminal, first and second output terminals, and a switching terminal for transmitting signals alternately from said input terminal to one of said output terminals in response to successive pulses on said switching terminal;

first and second binary counter means having equal numbers of stages and with the inputs to the first stages of each said first and second binary counter means being connected to said first and second terminals respectively of said signal steering means;

first and second logic means connected to the outputs of all of said stages in said first and second counters respectively for providing an output pulse when all of said stages in the associated one of said counters enters a predetermined final state;

the outputs of said first and second logic means each connected to said switching terminal; and preset circuit means having first and second inputs connected to the output of said first and second logic means respectively, a set of binary switches equal in number to the number of said stages in each of said counters, and a plurality of output lines each connected to a different one of said stages for presetting said stages of each of said counters to the same initial state determined by the state of said binary switches when an output pulse appears on the output of the associated one of said first and second logic means, whereby in response to an input signal at a first frequency applied to the input of said input signal steering means an output signal will be generated at said switching terminal having a second frequency and wherein the ratio of said first frequency to said second frequency is a function of the state of said set of binary switches.

2. The device according to claim 1 and wherein only said first stage of said counters changes state when said counters enter said predetermined final state.

* * * * *

PO-1050
(5/69)

UNITED STATES PATENT OFFICE
CERTIFICATE OF CORRECTION

Patent No. 3,678,398 Dated July 18, 1972

Inventor(s) Kai E. Thomenius

It is certified that error appears in the above-identified patent and that said Letters Patent are hereby corrected as shown below:

The filing date shown in the patent heading should read as follows;

-- March 23, 1971 -- .

Signed and sealed this 9th day of January 1973.

(SEAL)
Attest:

EDWARD M.FLETCHER,JR.
Attesting Officer

ROBERT GOTTSCHALK
Commissioner of Patents